United States Patent [19]

Glöckler et al.

[11] Patent Number: 5,009,397
[45] Date of Patent: Apr. 23, 1991

[54] PLANT TO BE USED FOR METALLURGICAL TREATMENTS OF METAL COMPOUNDS AND/OR METAL ALLOYS OR FOR PRODUCING CALCIUM CARBIDE

[75] Inventors: Gerhard Glöckler, Ohlsdorf; Heinz Müller, Neuhofen; Leopold W. Kepplinger; Panajiotis Matzawrakos, both of Linz; Erwin Koch, Leonding; Heinrich Auberger, Linz, all of Austria

[73] Assignee: Voest-Alpine Industrieanlagenbau GmbH, Linz, Austria

[21] Appl. No.: 502,336

[22] Filed: Mar. 30, 1990

[30] Foreign Application Priority Data

Apr. 13, 1989 [AU] Australia .................. A877/89

[51] Int. Cl.⁵ .................................. C21B 7/08
[52] U.S. Cl. .............................. 266/197; 266/901
[58] Field of Search ............. 266/200, 901, 177, 197, 266/900; 75/581, 707

[56] References Cited

U.S. PATENT DOCUMENTS

| | | | |
|---|---|---|---|
| 3,234,010 | 2/1966 | Mahony | 266/901 |
| 4,380,469 | 4/1983 | Sulzbacher | 75/707 |
| 4,581,063 | 4/1986 | Oyabu et al. | 266/901 |
| 4,691,900 | 9/1987 | Maeda | 266/901 |

Primary Examiner—S. Kastler, III
Attorney, Agent, or Firm—Hopgood, Calimafde, Kalil, Blaustein & Judlowe

[57] ABSTRACT

A plant for metallurgical treatments, in particular for melting or melt-reducing metals, metal compounds and/or metal alloys, or for producing calcium carbide, comprises a shaft receiving a burden, a melt collecting space disposed laterally of, and below, the shaft, as well as at least one burner arranged laterally of the shaft. In order to enable the accurate process control of the metal melt and the controlled smelting of the burden, the burner is arranged in a combustion space connecting the lower shaft end with the melt collecting space and designed as a plasma burner. The combustion space is located at a level above the melt collecting space and including a combustion space bottom, which is plane, or preferably rises, relative to the shaft and enters into the melt collecting space by an overflow edge that separates the metal melt from the burden.

7 Claims, 4 Drawing Sheets

PLANT TO BE USED FOR METALLURGICAL TREATMENTS OF METAL COMPOUNDS AND/OR METAL ALLOYS OR FOR PRODUCING CALCIUM CARBIDE

The invention relates to a plant for metallurgical treatments, in particular for melting or melt-reducing metals, metal compounds and/or metal alloys, or for producing calcium carbide, comprising a shaft receiving a burden, a melt collecting space or chamber disposed laterally of, and below, the shaft, as well as at least one burner arranged laterally of the shaft.

A plant of this type is known from U.S. Pat. No. 4,380,469. This known plant serves to continuously melt largely prereduced metallurgical materials, in particular sponge iron. With the known plant, the burden is fed from a shaft, via a long horizontal feeding space, to a melting vessel retaining the melt, the burden impinging on the bath surface of the melt in the free fall. Closely above the bath surface, a burner is arranged, which is charged with brown coal dust and oxygen and whose flame brushes over the bath surface and is directed towards the descending burden. The burden constitutes a conical pile footing in the melt.

Due to the conical or inclined pile of burden departing from the melt, overheating of the melt bath is impossible. With this known process, melt-reducing of the burden already introduced into the melt is not feasible, either. With this known process, it is, furthermore, disadvantageous that the temperature ad the energy density are limited by the type of combustion. This means that, if melt or melt-reduction processes call for substantially higher temperatures than those required in that case for melting the sponge iron, heating will not suffice.

The invention aims at eliminating these disadvantages and difficulties and has as its object to provide a plant of the initially defined kind, in which high temperatures and energy densities can be attained and in which the formation of combustion gases likely to disturb the metallurgical process is prevented. In addition, the residence time of the burden within the combustion space is to be precisely calculated with a view to enabling the controlled melting and melt-reduction of the burden. Furthermore, the energy fed to the furnace is to be utilized in the optimum way, thermal losses having to be kept low.

In accordance with the invention, this object is achieved in that the burner is arranged in a combustion space connecting the lower shaft end with the melt collecting space or chamber and designed as a plasma burner, the combustion space chamber being located at a level above the melt collecting space and including a combustion space bottom, which is plane e.g., horizontally disposed, or preferably rises, relative to the shaft and enters into the melt collecting space by an overflow edge that separates the metal melt from the burden.

The plant according to the invention, in particular, is suitable for melting ferrous alloys, such as Fe-Mn, Fe-Si, Fe-Cr, Fe-W, Fe-V, Fe-Mo, Fe-Ni, Fe-Co, Fe-Ti, Fe, Nb, Fe-Ta, Fe-P and Fe-Zr, as well as for melting the metals Cu, Al, Ni, Co, Mg, Cr, W, Mo, Zr, Si, Hf, V and alloys thereof, as well as for producing calcium carbide.

Preferably, the combustion space widens from the shaft space towards the melt collecting space, seen in the ground plan.

The furnace shows its optimum heat balance if the shaft space partially surrounds the combustion space peripherally and the melt collecting space follows on the side of the combustion space that is clear of the shaft space.

Advantageously, a burden conveying means is provided in the transition space from the shaft space to the combustion space, thus enabling the exact dosage of the burden feed rate.

According to a preferred embodiment, the burden conveying means is designed as a slant sliding surface.

Another preferred embodiment is characterized in that the burden conveying means is designed as a pushing device.

In order to optimumly utilize the gas forming in the combustion space with respect to the sensible heat afforded by the gas, the dusts, intermediate products, sublimates and condensates contained therein, as well as in order to achieve an optimum controllability of the plant with a view to adjusting the preheating and reaction temperatures prevailing in the shaft, to reduce the noxious substances emitted and to provide for a uniform furnace operation, the combustion space suitably includes a flue adapted to be connected with the shaft furnace via at least one branch duct.

If fine burden, alloying elements and fluxes are to be introduced into the combustion space, this suitably is realized by having a supply duct enter into the combustion space.

In order to be able to more readily start the plant and to locally control the temperature distribution, the plasma burner is adapted to be moved optionally from a position A projecting into the combustion space into a position B projecting inwards the melt collecting space, and vice versa.

The invention will now be explained in more detail by way of the exemplary embodiments illustrated in the drawing, wherein.

Figure 1:
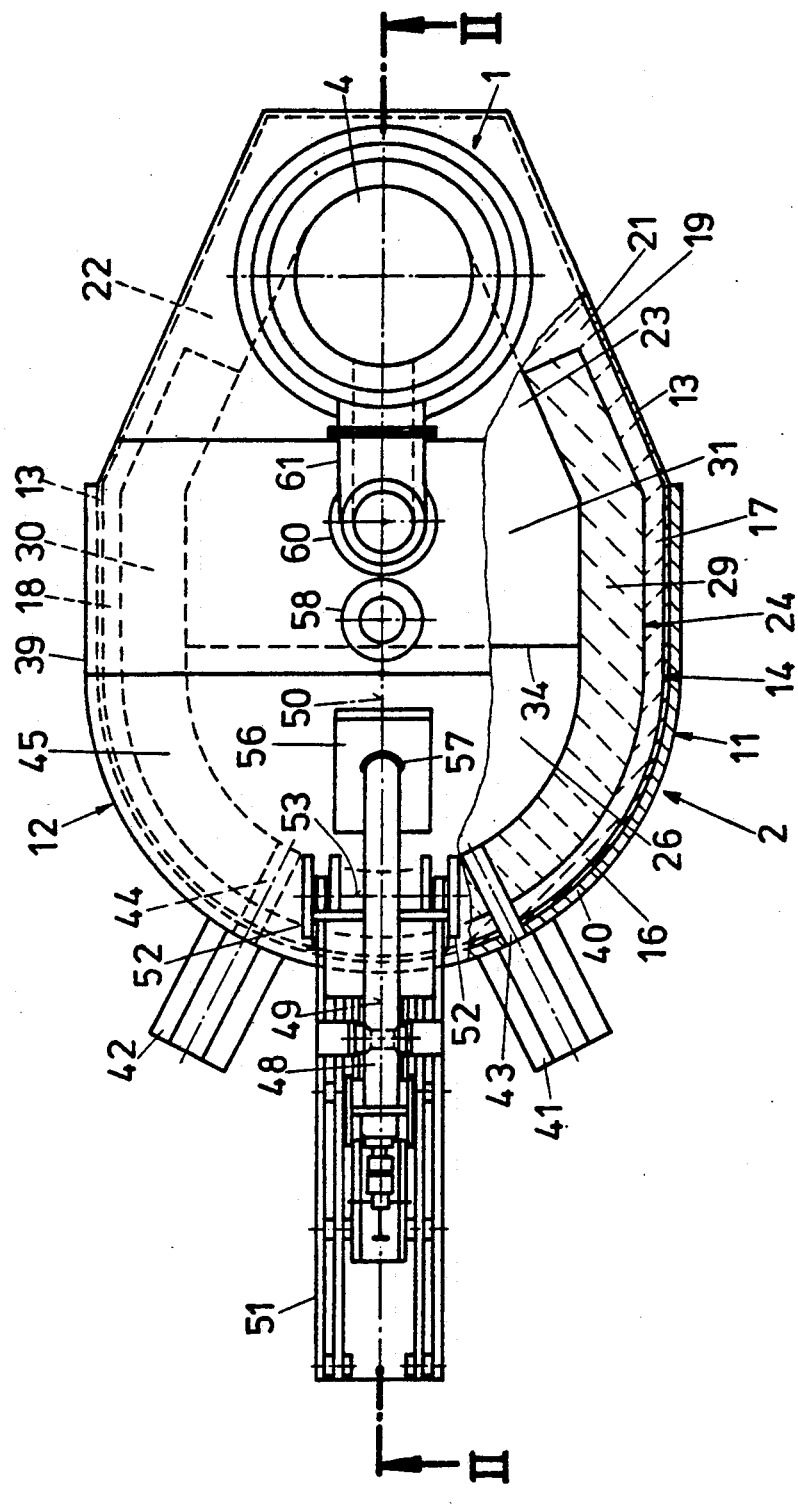
FIG. 1 is a partially sectioned ground plan of the plant according to the invention.
Figure 2:
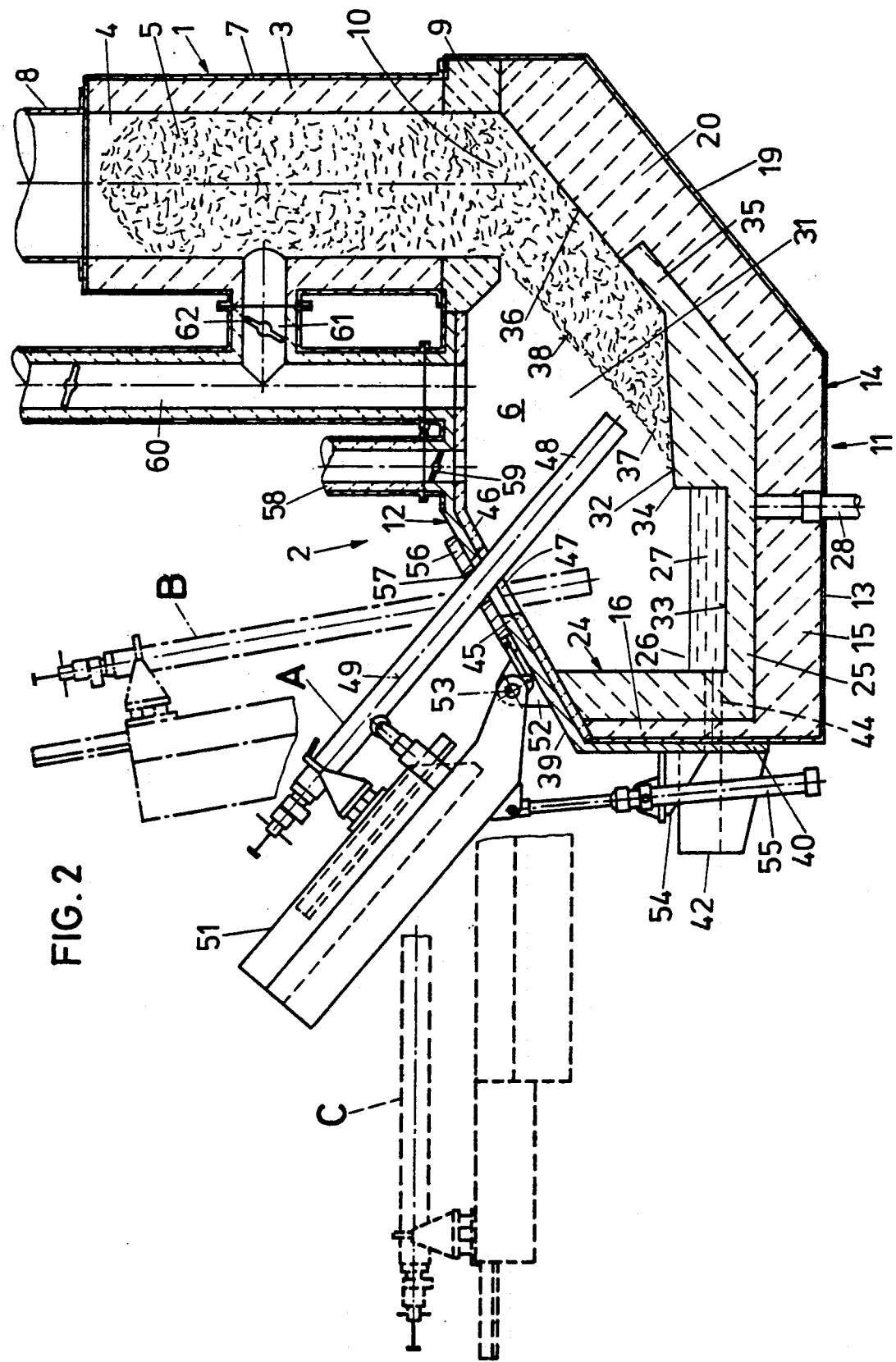
FIG. 2 represents a vertical section according to line II—II of FIG. 1.

The plant according to FIGS. 1 and 2 comprises a shaft 1 and a melting furnace 2 integrally connected therewith and arranged laterally therebelow. The shaft 1 extends upwardly from the melting furnace 2 approximately in the vertical direction and has a refractory internal lining 3 defining a shaft space 4 of circular cross section. The shaft space 4 is filled with burden 5, through which gases formed in the furnace interior space 6 of the melting furnace 2 flow.

The internal lining 3 of the shaft 1 is surrounded by a plate jacket 7. To the upper end of the shaft 1 a tubular burden feeding means 8 is flanged. On its lower end, the shaft furnace 4 runs into the interior space 6 of the melting furnace 2 via an entry region 10 delimited by a flange 9.

The melting furnace 2 comprises a furnace lower section 11 and a hood 12 covering the latter, which delimit the furnace interior space 6. The furnace lower section 11 is provided with an external brickwork 14 including a horizontal bottom part 15 and surrounded by a plate jacket 13. A wall 16, which is chambered in ground section and extends vertically upwards as far as to the hood 12, follows upon the end of the bottom part 15 that faces away from the shaft 1, which wall 16 laterally verges into side walls 17, 18 parallel to each other and directed vertically upwards from the bottom part 15. These side walls 17, 18 likewisely extend as far as to the hood 12.

A transition part 19 of the external brickwork 14 follows upon the end of the bottom part 15 of the external brickwork 14 that faces the shaft 1, extending as far as to the entry region 10 of the shaft 1, whose bottom 20 sharply rises towards the shaft 1 and whose side walls 21, 22 extending vertically upwardly as far as to the hood 12 are arranged in a V-shaped manner, seen in the ground plan, delimiting a transition space 23 that widens towards the furnace interior space 6.

The external brickwork 14 of the furnace lower section 11 encloses an electrically conductive internal brickwork 24 delimiting the furnace interior space 6, whose bottom part 25 incorporates a concavity in the region facing away from the shaft 1, which concavity constitutes a melt collecting space 26 for metal melt 27 and is approximately semi-circular in ground plan.

In the bottom part 15 of the external brickwork 14, a bottom electrode 28 is provided in the region of the melt collecting space 26, being in contact with the brickwork 24.

A combustion space 31 borders at the melt collecting space 26, which combustion space is laterally delimited by parallely arranged combustion space side walls 29, 30 extending vertically as far as to the hood 12 and laterally as far as to the transition part 19. The combustion space bottom 32, which is slightly rising relative to the shaft 1 (at an angle of up to 5°), is located at a higher level that the bottom 33 of the melt collecting space 26 and verges into the melt collecting space 26 via an overflow edge 34. The combustion space bottom or shelf 32, by a brickwork part 35 that rises relative to the shaft 1 and reaches into the transition part 19, projects towards the shaft space 4, which, however, extends only over a lower portion of the sharply rising transition part 19.

The interior surface of the sharply rising brickwork part 35 of the internal brickwork 24 and the interior surface of the likewisely sharply rising bottom 20 of the external brickwork 14 constitute a sliding surface 36 reaching to below the shaft space 4. The burden 5 automatically gets into the combustion space 31 over this sliding surface 36, coming to rest on the combustion space bottom 32, the foot 37 of the conical pile 38 formed by the burden extending to near the overflow edge 34 towards the melt collecting space 26. The inclination of the slant sliding surface 36, which function as a conveying means in this way, is chosen approximately in accordance with the angle of repose of the burden 5.

The hood 12 of the melting furnace 2 is formed by a water-cooled plate armor 39. The plate armor 39 envelops the vertically upwardly oriented walls 16, 17, 18 of the external brickwork 14 of the furnace lower section 11. On the external jacket of the vertically upwardly oriented arcuate hood section 40, two tapping chutes 41, 42 are arranged at an angle relative to each other, into which one tap opening 43, 44 of the melt collecting space 26 each enters.

The hood section 45 disposed above the melt collecting space 26 extends towards the shaft 1 obliquely upwards, continuing in the horizontal direction above the region of the combustion space 31 as far as to the shaft 1.

The hood section 45 covering the furnace interior space 6 is provided with a brickwork 46 on its internal side. In the slant of the hood section 45, an opening 47 is provided, through which a plasma burner 48 projects into the furnace interior space 6 of the melting furnace 2. The plasma burner 48, whose longitudinal axis 49 is disposed in a vertical plane laid through the longitudinal axis 50 of the plant, in the regular operating position A illustrated in full lines, extends obliquely downwards into the combustion space 31 of the melting furnace 2 and is directed towards the foot 37 of the conical burden pile 38.

The plasma burner 48 is mounted in a guiding arrangement so as to be displaceable in the direction of its longitudinal axis 49, which guiding arrangement is fastened in a manner pivotable about a horizontal axis 53, to articulated brackets 52 rigidly fastened in the slant of the hood portion 45. The pivotal movement is effected by a pressure medium cylinder 55, such as a hydraulic cylinder, arranged below the pivotable guiding arrangement 51 and hinged to a bracket 54 rigidly fastened to the vertical arcuate hood section 40.

Thus, the plasma burner 48 is displaceable and/or pivotable from its regular operating position A into another position, i.e., into position B illustrated in FIG. 2 by dot-and-dash lines, in which it is directed towards the melt collecting space 26, and into a resting position C illustrated in broken lines, in which the plasma burner 48 is located beyond the melting furnace 2. In order to obtain a good guidance of the part of the plasma burner 48 that projects into the furnace interior space 6 in any of the various positions and to keep the thermal losses caused by the opening 47 provided in the hood section 45 as low as possible, a sliding window 56 including a recess 57 is displaceably arranged on the external jacket of the hood section 45 in the region of the opening 47, which sliding window 56 is automatically moved with the plasma burner 48 as the latter is pivoted, thus minimizing the diameter inside the recess 57 which is necessary for the plasma burner.

To the external jacket of the hood 12, a feeding duct 58 arranged above the combustion space 31 and extending vertically upwards is flanged, which feeding duct includes a control or retention flap 59 for fine burden. Between the feeding duct 58 and the shaft 1, a tubular flue 60 is flanged to the external jacket of the hood 12, oriented parallel to the shaft. The flue 60 leads into the shaft space 4 via one or several branch duct(s) 61 each incorporating a control flap 62.

Figure 3:
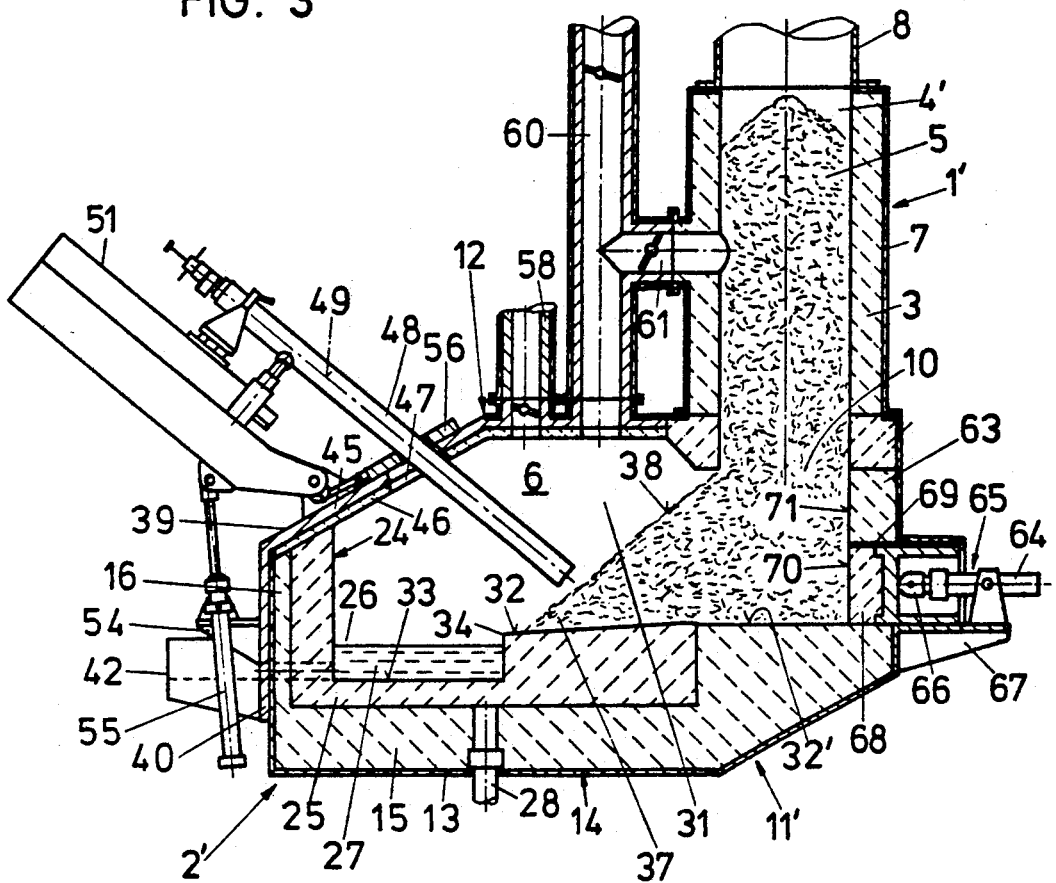
FIG. 3 depicts another exemplary embodiment of a plant in an illustration analogous to FIG. 2.
Figure 4:
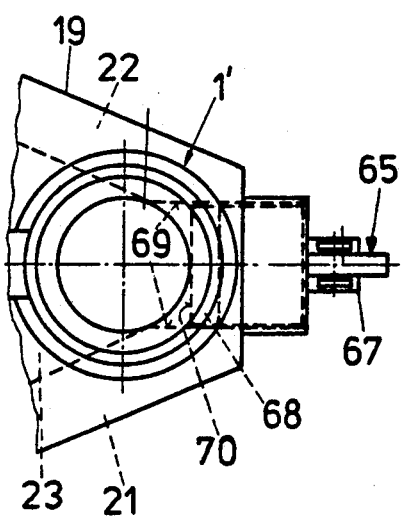
FIG. 4 is a partial ground plan of FIG. 3.

With the embodiment depicted in FIGS. 3 and 4, a horizontally extending bottom 32' is provided in the transition region from the shaft space 4' to the combustion space 31 of the melting furnace 2' instead of the sliding surface 36 of the brickwork 14, 24 rising towards the shaft 1', a vertical wall 63 following upon this bottom, extending vertically upwards as far as to the flange 9 in the lower end on the shaft 1'. In this case, the burden 5 is transported by a pushing device 65 to be operated by means of a pressure medium cylinder 64. The piston rod 66 of the pressure medium cylinder 64. The piston rod 66 of the pressure medium cylinder 64, which is hinged to a console 67 rigidly fastened to the furnace lower section 11', is articulated to a piston 68 penetrating a corresponding opening 69 provided on the lower end of the vertical wall 63 of the furnace lower section 11', the front face 70 of the piston 68 extending the interior surface 71 of the vertical wall 63 with the piston rod retracted. Burden 5 is conveyed into the combustion space 31 by a horizontal thrust movement of the piston 68.

Figure 6:
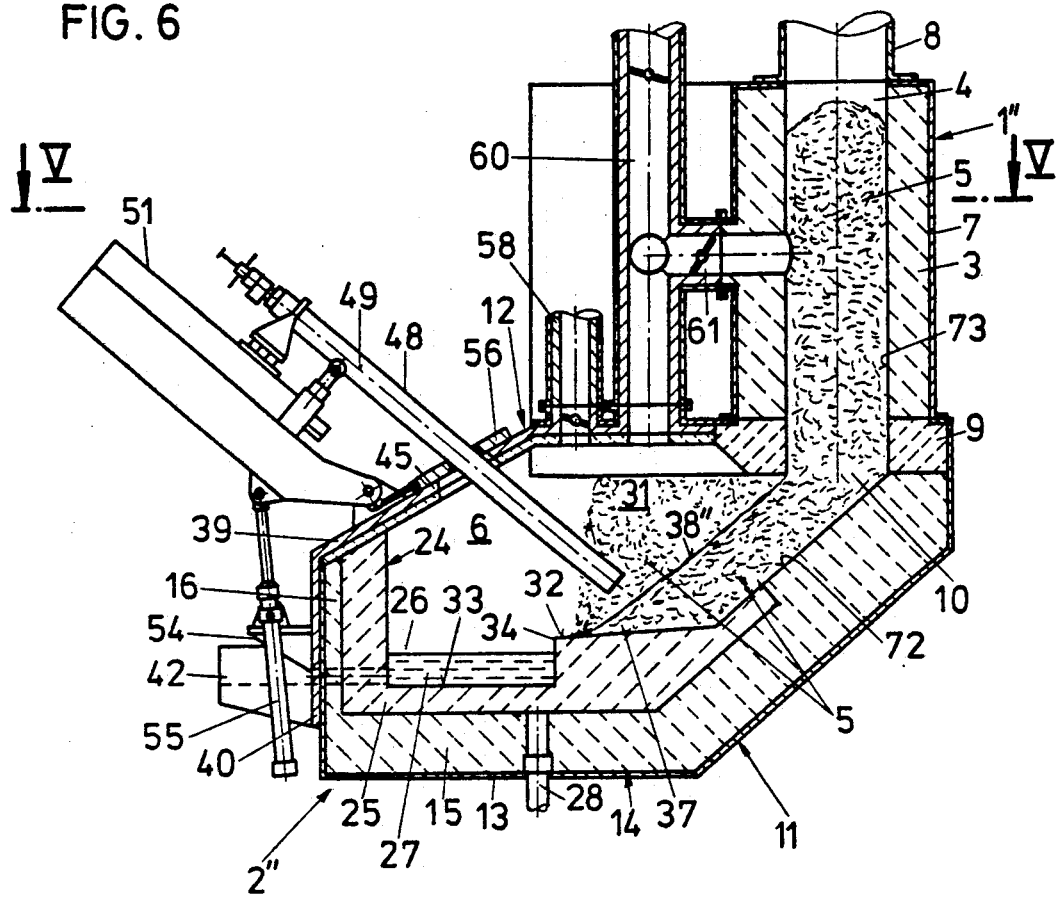
FIG. 6 is a vertical section along line VI—VI of FIG. 5.
Figure 5:
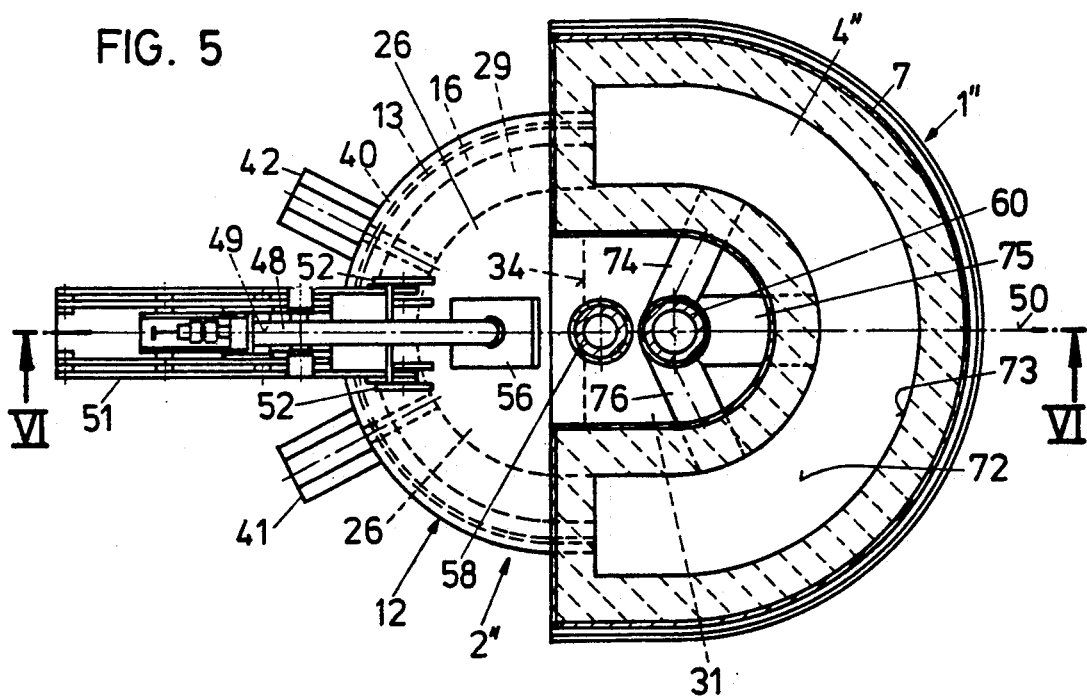
FIG. 5 illustrates a further embodiment in partially sectioned ground plan.

According to the embodiment illustrated in FIGS. 5 and 6, the combustion space 31 is peripherally surrounded by a shaft 1" U-shaped in ground plan, the open end of the U being directed towards the melt collecting space 26. The furnace lower section 11" of the melting furnace 2" comprises a conical sliding surface 72 rising towards the shaft 1" and peripherally surrounding the combustion space 31, which sliding surface verges into the U-shaped vertical external limitation wall 73 of the shaft space 4". Several angularly arranged branch ducts 74, 75, 76 of the flue 60 lead into the shaft space 4" such that uniform gas absorption by the burden 5 is ensured. The shaft space 4" surrounding the combustion space 31 allows for the formation of a conical burden pile 38" uniformly distributed about the plasma burner 48, the lateral heat radiation of the plasma arc, thus, being directed towards the burden 5, sparing the brickwork 14, 24.

The operation of the plant is explained in more detail below by way of the embodiment illustrated in FIGS. 1 and 2.

After charging of the plant, the plasma burner 48 is displaced from the resting position C into position B, in which it is ignited against the conductive material remaining in the melt collecting space 26. After this, the plasma burner 48 is directed towards the foot 37 of the conical pile 38 of burden. The burden at the foot 37 of the conical pile 38 of burden is smelted, the slag forming flows over the overflow edge 34 into the melt collecting space 26 arranged at a lower level. According to the melt-off rate, more burden 5 slides down the sliding surface 36 that rises towards the shaft 1.

Due to the spacial separation of the conical burden pile 38 from the melt collecting space 26, the then lumpy burden of the conical pile 38 cannot get into the melt bath 27. Thus, accurate process control is ensured, because the molten phase is separated from the burden, random overheating of the bath in the melt collecting space 26 being attainable by directing the plasma burner 48 also towards the melt collecting space 26 and heating the melt bath 27 to the desired temperature.

The gases forming within the furnace interior space 6 pass through the burden 5 in the shaft 1 from bottom to top, preheating the same to effect the desired reactions, e.g., a prereduction.

With the plant according to the invention, the heat generated in the furnace interior space 6 by the process gases, dusts and intermediate products, such as sublimates or condensates, is fed to the burden 5 in the shaft space 1 via the entry region 10. Feeding also may be effected through branch ducts 60, 61, which may be arranged one above the other such that the gases drawn off the furnace interior space 6 can be fed to the shaft furnace 4 at different levels, thus being able to adjust any desired temperature course and to ensure uniform furnace operation.

The advantages of all these ways of feeding reside in the optimum utilization of the heat from the gases, dusts and intermediate products formed in the furnace interior space 6 and the accordingly lower specific energy consumption of the plant. In addition, these feeding ducts allow for an optimum separation of dusts and intermediate products from the burden 5 and hence an optimum output as well as a reduction of the pollutants possibly emitted by the plant. Suitably, an electronic control station is provided to control the various process parameters (e.g., furnace pressure, material dosage).

The invention is not limited to the exemplary embodiments illustrated in the drawings, but may be modified in various aspects. The combustion space bottom 32 may, for instance, be designed to extend horizontally. Moreover, adjustment means other than pressure medium cylinders 55, 64, such as, for instance, threaded spindles, may be employed. On the upper end of the shaft space 4, 4', 4", a suction draught van, preferably at variable revolutions, may be provided to effect a rapid and energy-saving adaptation of the flow speed of the gases flowing through the shaft, as a function of the respective process requirements.

An exemplary embodiment is described below:

To produce ferromanganese carbure, South African manganese ores having the ore analyses indicated in Table 1 are used.

TABLE 1

| Manganese ore | CaO (%) | MgO (%) | SiO$_2$ (%) | Mn (%) | Fe (%) |
|---|---|---|---|---|---|
| Ore I (MAMATWAN) | 14.9 | 3.13 | 4.25 | 38.5 | 4.53 |
| Ore II (WESSELS WH) | 5.25 | 0.66 | 5.8 | 50.0 | 9.26 |
| Ore III (WESSELS WL) | 5.26 | 0.64 | 7.16 | 48.0 | 12 |

The following reductants are used:
Coke: $C_{fix} = 90\%$
Coal: $C_{fix} = 54.2\%$
The mixing ratio of coal and coke is 60:40.

The raw material charge is composed of a mixture as indicated in Table 2.

TABLE 2

| | kg/t ore |
|---|---|
| Ore I (MAMATWAN) | 600 |
| Ore II (WESSELS WH) | 170 |
| Ore III (WESSELS WL) | 230 |
| Scrap | 57 |
| Quartz | 25 |
| Coal | 195 |
| Coke | 84 |

At the production of ferromanganese, the following operational values result:

TABLE 3

| Charge: | |
|---|---|
| Ore | 1585 kg/h |
| Quartz | 40 kg/h |
| Reductants | 442 kg/h |
| Scrap | 10 kg/h |
| Product (FeMn) | 757 kg/h |
| Slag | 499 kg/h |
| Effective output of furnace | 2.5 MW |
| Analysis of the furnace gas: 70% CO, 15% CO$_2$, 10% H$_2$ and 5% N$_2$. Additionally, 22.5 m$^3_n$/h argon incur. | |
| Gas exit temperature on shaft end: below 500° C. | | the analysis of the metal produced is contained in Table 4 below; the analysis of the incurred slag is contained in Table 5.

TABLE 4

| | (%) |
|---|---|
| Mn | 76.6 |
| Fe | 15.4 |
| Si | 0.20 |
| C | 7.00 |

TABLE 5

| | (%) |
|---|---|
| CaO | 38 |
| MgO | 7,5 |
| SiO$_2$ | 32,5 |
| FeO | 0,20 |
| MnO | 19,55 |
| Balance Al$_2$O$_3$, metallic portions, etc. | |

With the furnace according to the invention, manganese losses due to manganese evaporation are avoided, as they occur with plasma furnaces having no shaft, i.e., plasma furnaces having an arrangement that is open towards the flue side and in which the flue gases are carried away from the plasma furnace directly into a flue system. With such furnaces, the yield of the manganese produced is less than 60%, the manganese content within the metal amounting to no more than 72 to 77%. The manganese losses caused by evaporation due to the high plasma temperatures amount to more than 10%. Hence results a very high energy consumption of 3,800 to 4,500 kWh/t ferromanganese.

With the furnace according to the invention, a manganese yield up to 84% is feasible, the manganese content within the ferromanganese amounting to 76 to 78%.

As compared to known electric low shaft furnaces, the furnace according to the invention has the advantage that even dusty charging materials may be employed. In contrast to the electric low shaft furnace, the MnO content of slag can be kept lower with the furnace according to the invention by increasing the basicity, thus enhancing the yield of manganese.

What we claim is:

1. In a plant comprising a furnace for producing a product melt from a metallurgical burden in which the furnace has a laterally disposed melt collecting chamber at one end and an upwardly disposed burden-receiving shaft comprising an upper portion and a lower portion at the other end of said furnace, and at least one burner means entering said furnace above said melt chamber directed towards burden flowing downwardly of said shaft through the lower portion thereof into said furnace, the improvement which comprises:
   a combustion chamber disposed above said melt chamber which communicates said melt chamber with the lower portion of said shaft, and
   a shelf disposed below the lower portion of said shaft serving as the bottom of said combustion chamber, said shelf extending to and above said melt chamber and terminating into an overflow edge over which melt produced from said burden enters said melt chamber,
   said shelf also providing support for said burden flowing down said shaft for metallurgical treatment by said burner means and adapted via its overflow edge to separate the melt from the burden,
   said burden means comprising a plasma burner.

2. The plant as in claim 1, wherein said shelf is disposed substantially horizontal relative to said shaft.

3. The plant as in claim 1, wherein at least a portion of said shelf is disposed upwardly relative to said shaft.

4. The plant as in claim 1, wherein said combustion chamber as viewed in plan view increases in width from said shaft end to said melt chamber.

5. The plant as in claim 1, wherein said shaft is configurated as a U-shape to partially surround said combustion chamber peripherally with the melt chamber disposed forwardly of said U-shaped shaft.

6. The plant as in claim 1, wherein a transition space is provided between said shaft and said combustion chamber, with burden conveying means provided in said transition space.

7. A plant as set forth in claim 6, wherein said burden conveying means comprises an inclined sliding surface.

* * * * *

UNITED STATES PATENT AND TRADEMARK OFFICE
CERTIFICATE OF CORRECTION

PATENT NO. : 5,009,397

DATED : April 23, 1991

INVENTOR(S) : Gerhard Glockler et al.

It is certified that error appears in the above-identified patent and that said Letters Patent is hereby corrected as shown below:

On the title page:

For Item [30], "Australia" should be --Austria--.

Signed and Sealed this

Twenty-second Day of December, 1992

*Attest:*

DOUGLAS B. COMER

*Attesting Officer*   Acting Commissioner of Patents and Trademarks